E. E. GRAY.
FENDER LAMP RECEPTACLE.
APPLICATION FILED JUNE 17, 1912.
1,165,090.
Patented Dec. 21, 1915.
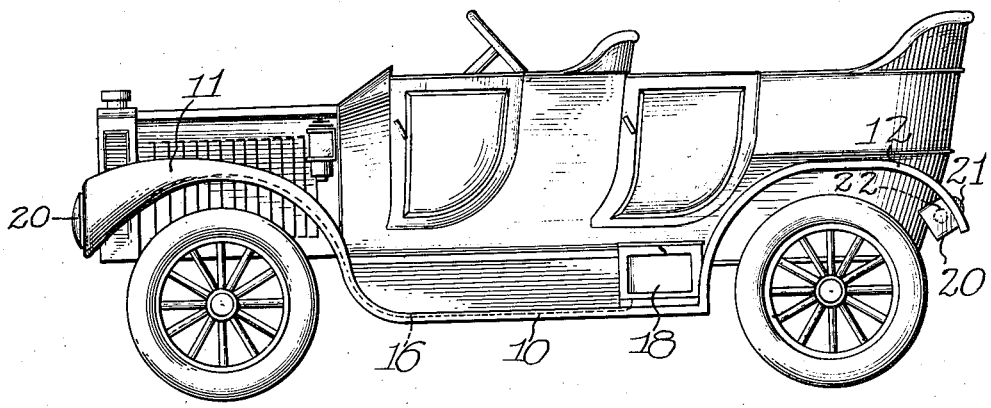
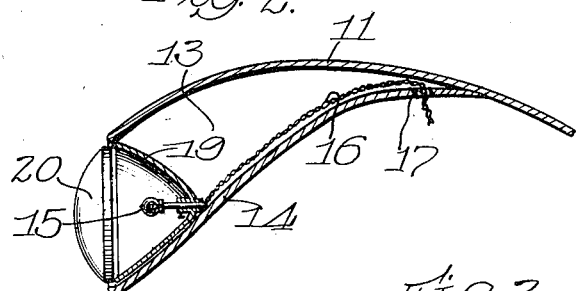
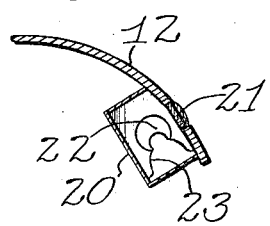
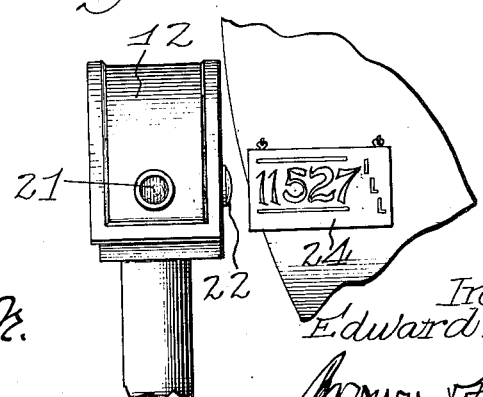
Witnesses:
G. W. Tomarus Jr.
R. Bauerle.
Inventor:
Edward E. Gray
By Brown & Hopkins
Attys.

UNITED STATES PATENT OFFICE.

EDWARD E. GRAY, OF PLANO, ILLINOIS, ASSIGNOR TO GRAY PNEUMATIC GEAR SHIFT COMPANY, A CORPORATION OF ILLINOIS.

FENDER LAMP-RECEPTACLE.

1,165,090.

Specification of Letters Patent.

Patented Dec. 21, 1915.

Application filed June 17, 1912. Serial No. 704,064.

*To all whom it may concern:*

Be it known that I, EDWARD E. GRAY, a citizen of the United States, residing at Plano, in the county of Kendall and State of Illinois, have invented certain new and useful Improvements in Fender Lamp-Receptacles, of which the following is a specification.

This invention relates to lamp receptacles for vehicles, and particularly for automobiles, the fender of the machine being formed with a recess and provided with a receptacle for containing or supporting a lamp.

The principal object of the invention is to simplify the construction and improve the appearance of the vehicle by incorporating the lamp receptacle in the fender whereby the fender presents a neat appearance and at the same time provides a simple and suitable receptacle for lamps.

For the attainment of these ends and the accomplishment of other new and useful objects, as will appear, the invention consists in the features of novelty in the construction, combination and arrangement of the several parts, generally shown in the accompanying drawing and described in the specification, but more particularly pointed out in the appended claims.

In the drawing Figure 1 is a side view of an automobile having a fender constructed in accordance with the principles of my invention. Fig. 2 is a cross sectional view of the front end of a fender provided with a lamp receptacle. Fig. 3 is a detail view of the rear of the fender provided with a lamp receptacle. Fig. 4 is a detail sectional view of a tail lamp and receptacle, showing two bull's eyes disposed in the receptacle.

In automobile construction, the tendency of the manufacturers at the present time, is to simplify the construction and do away as much as possible with all unnecessary parts and to avoid cumbersome and intricate mechanism. It is also desired to improve the appearance and simplify the lines of the machine, making a neat and simple appearing structure. To these ends and for these purposes, the present construction is adapted.

Referring now more particularly to the drawing and in the present exemplification of the invention, a vehicle, such as an automobile, is commonly provided with a running board 10, a front fender 11, and a rear fender 12. These parts are generally separately constructed and attached to the machine, and secured to the machine and to each other in any suitable manner. It is also obvious that the two fenders and the running board may be continuous or constructed in any suitable or well-known way.

The front fender 11 preferably extends over and in front of the front wheel and is rounded or curved over the wheel in any desired or suitable manner. The front end of the fender 11 is provided with a recess 13 opening from the forward end thereof and presenting at the front end a substantially round opening. This recess 13 is formed in any desired manner, such for example, as by attaching a separate piece or pieces to the fender, but preferably by rounding the edges of the front ends of the fender and bending them together to form the recess. In Fig. 2 the bent-over edges are represented by the numeral 14 and it will be evident that the recess 13 formed thereby is substantially closed at all points except at the front opening. The object of this construction is to present a substantially closed recess which will not become filled with dirt and the like.

Disposed in the recess 13 is a lamp 15 of any desired kind or construction. It is obvious that either a gas, oil or electric lamp may be employed for this purpose, but as shown in the present exemplification of the invention an electric lamp is used, which is provided with suitable electrical conductors 16 extending into the recess 13. An opening 17 is provided in the fender at some suitable point, preferably at the rear of the recess 13 and beneath the fender 11, so that the conductors 16 may be secured to the underside of the fender and disposed under the running board 10 and connected to a suitable source of current supply, such, for example, as an electric battery disposed in a box 18 mounted on the running board 10.

In the recess 13 between the lamp 15 and the fender is a reflector 19 which may be of any suitable kind or construction. Disposed in the front opening of the recess 13 is a lens or bull's eye 20 which forms a closure or door for the recess and is adapted to project the light from the lamp in a forward direction. This lens is commonly hinged at one side of the fender so that access may be had to the interior of the chamber and to the inside of the reflector 19 for adjusting or replacing the lamp 15.

The rear fender 12 is provided with a receptacle 20 secured thereto having a bull's eye 21 in the face of the fender and another bull's eye 22 at the inside thereof and the receptacle is provided with a lamp 23. The bull's eye 21 is preferably of red glass and the bull's eye 22 is preferably of white glass so that a red light is projected from the rear of the machine and a white light is projected inside of the fender to illuminate the machine number 24 mounted upon the body of the machine in the well-known manner.

From this description it will be evident that a suitable lamp receptacle is incorporated with the fender of the machine, particularly at the forward end of the vehicle, which simplifies the construction, producing a neat appearance and obviating the necessity for separate brackets for the lamps without sacrificing any of the desirable features of the separate mounting of the lamps.

While I have thus described the preferred embodiment of my invention, it is obvious that others may make various changes in the construction, combination and arrangement of the several parts without departing from the spirit and scope of my invention.

What I claim is:

1. A fender for a vehicle comprising a rounded conical portion at one end forming a recess, the base of the conical portion being outward and open at the end, and a lamp for the recess.

2. A fender provided with a lamp recess, the recess consisting of the sides of the end of the fender bent together to form an inclosure, and a lamp for the recess.

3. The combination with a fender formed with an inclosed lamp recess therein having a diverging circular opening at the outer end, of a lamp for the recess, and a projecting reflector disposed at the back and sides of the recess conforming to the shape of the recess.

4. In combination, a fender with a lamp recess in the end thereof consisting of the sides of the end bent together to form an inclosure, a lamp disposed therein, and a reflector disposed in the recess behind the lamp.

5. In combination, a fender with the edges thereof turned together to form an end lamp recess with a substantially round end opening, a lamp in the recess, and a lens disposed at the end opening to constitute a door for the lamp recess.

6. In combination, a fender with a receptacle incorporated in the outer end thereof as an integral part of the fender, the outer opening of the receptacle being substantially circular and the receptacle converging inwardly from the opening, a lamp in the receptacle, and a bull's-eye forming a closure for the circular opening.

7. The combination with a vehicle fender extending over the wheel of the vehicle with a receptacle at the forward end thereof the sides of which conform both to the curvature of the wheel and to the curvature of the fender forming a recess open at the end of the fender and largest at the outer end, and a lamp disposed within the recess.

In testimony whereof I have signed my name to this specification, in the presence of two subscribing witnesses, on this 13th day of June A. D. 1912.

EDWARD E. GRAY.

Witnesses:
JAS. HALLEY,
X. WHITFIELD.